(12) United States Patent
Matsunaga

(10) Patent No.: US 7,190,910 B2
(45) Date of Patent: Mar. 13, 2007

(54) IMAGE FORMING APPARATUS, CONTROL METHOD FOR THE SAME, AND PROGRAM

(75) Inventor: Daisuke Matsunaga, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 204 days.

(21) Appl. No.: 10/985,802

(22) Filed: Nov. 10, 2004

(65) Prior Publication Data

US 2005/0105920 A1    May 19, 2005

(30) Foreign Application Priority Data

Nov. 14, 2003  (JP)  ............... 2003-385088

(51) Int. Cl.
*G03G 15/00* (2006.01)

(52) U.S. Cl. .................. 399/1; 399/9; 399/81

(58) Field of Classification Search .......... 399/1, 399/9, 16, 81, 8, 361, 382, 411
See application file for complete search history.

(56) References Cited

U.S. PATENT DOCUMENTS

2005/0024393 A1* 2/2005 Kondo et al. ............ 399/1

FOREIGN PATENT DOCUMENTS

| JP | H08-44255 | | 2/1996 |
| JP | 2001-105628 | A | 4/2001 |
| JP | 2003-115957 | | 4/2003 |
| JP | 2004-195845 | A * | 7/2004 |
| JP | 2004-223966 | A * | 8/2004 |

* cited by examiner

*Primary Examiner*—Sophia S. Chen
(74) *Attorney, Agent, or Firm*—Canon USA, Inc. Intellectual Property Division

(57) ABSTRACT

An image forming apparatus writes job information associated with an image forming process to a contactless integrated chip attached to recording paper and reads out the job information from the contactless integrated chip attached to recording paper remaining uncollected after completion of the image forming process. Thereafter, the image forming apparatus notifies, based on the read out job information, the user that initiated the job that the recording paper is uncollected after completion of the image forming process.

20 Claims, 14 Drawing Sheets

FIG. 9A

CURRENT TIME 13:15

| JOB ID | USER NAME | FILE NAME | JOB EXECUTION TIME | NEXT-NOTIFICATION TIMING |
|---|---|---|---|---|
| 2489 | matsunaga | xxx.doc | 12:45 | 1:00 |
| 2490 | matsumura | yyy.ppt | 13:00 | 0:30 |
| 2492 | yoshida | zzz.doc | 13:15 | 0:30 |
|  |  |  |  |  |

FIG. 9B

| USER NAME | MAIL ADDRESS |
|---|---|
| matsunaga | matsunaga1212@host.co.jp |
| matsumura | matsumura0403@host.co.jp |
| yoshida | yoshida@host.co.jp |
|  |  |

FIG. 10A

To : 0
   / /   :
< Output document reminder mail >

Your output document has left for more than

Would you take it off as soon as possible ?

Document  :
Output time :

Noticed by
IP     : 133.1.1.15
NAME : IR-5000

FIG. 10B

To : matsunaga ( matsunaga1212@host.co.jp )

2003/05/20 13:15
< Output document reminder mail >

Your output document has left for more than 30 minutes.
Would you take it off as soon as possible ?

Document   : xxx.doc
Output time : 12:45

Noticed by
IP     : 133.1.1.15
NAME : IR-5000

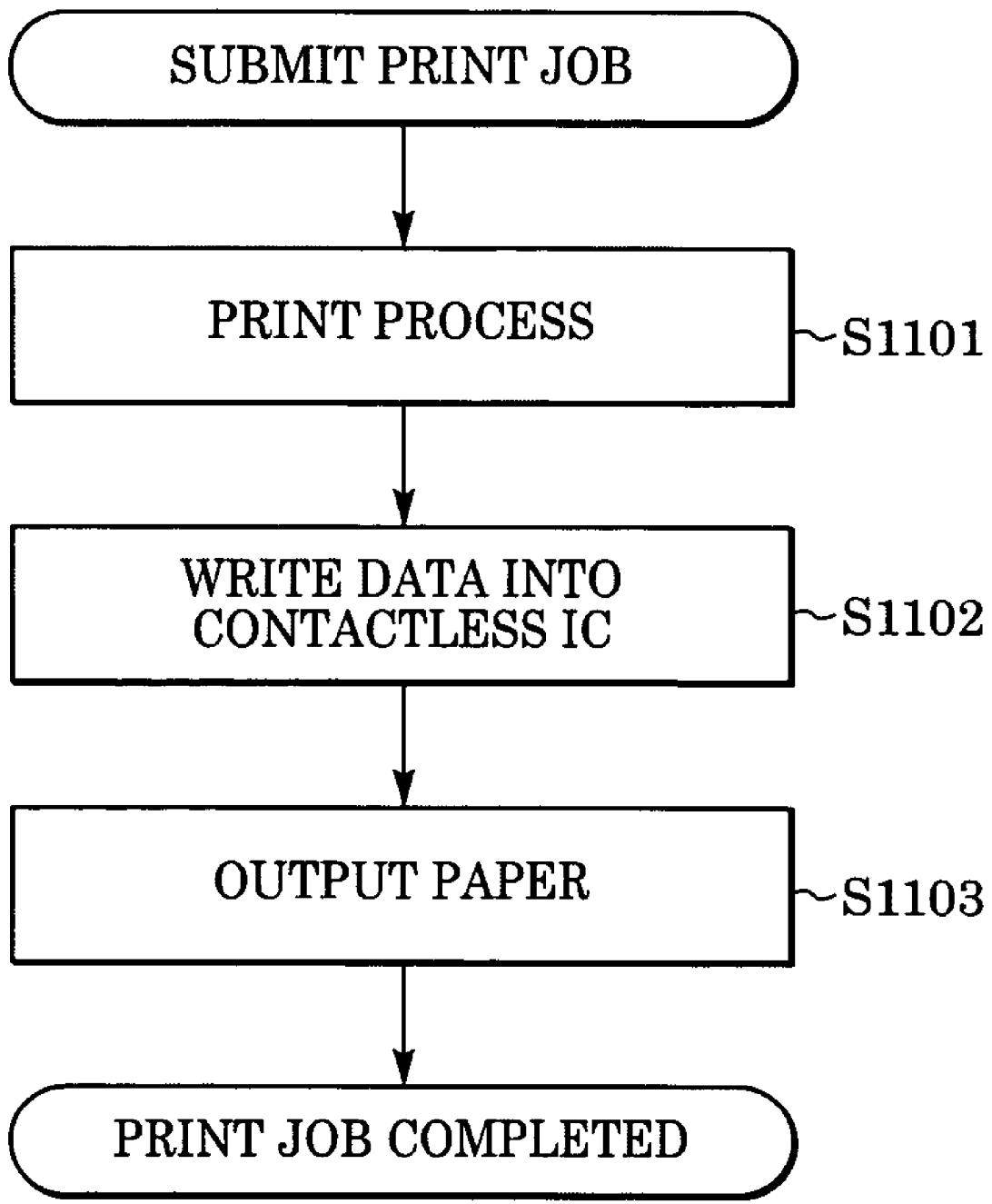

FIG. 12A

| JOB ID | SERIAL ID | USER NAME | FILE NAME | JOB EXECUTION TIME | NEXT-NOTIFICATION TIMING |
|---|---|---|---|---|---|
| 2489 | 01020321<br>01020322<br>01020323<br>01020324 | matsunaga | xxx.doc | 12:45 | 1:00 |
| 2490 | 01020325<br>01024872<br>01024873<br>01024874<br>01024875<br>26350016 | matsumura | yyy.ppt | 13:00 | 0:30 |
| 2492 | | yoshida | zzz.doc | 13:15 | 0:30 |
| | | | | | |

FIG. 12B

| JOB ID | SERIAL ID | USER NAME | FILE NAME | JOB EXECUTION TIME | NEXT-NOTIFICATION TIMING |
|---|---|---|---|---|---|
| 2489 | 01020321<br>01020322<br>01020323<br>01020324 | matsunaga | xxx.doc | 12:45 | 1:00 |
| 2490 | 01020325<br>01024872<br>01024873<br>01024874<br>01024875<br>26350016 | matsumura | yyy.ppt | 13:00 | 0:30 |
| 2492 | 32650195<br>32997507 | yoshida | zzz.doc | 13:15 | 0:30 |
| | | | | | |

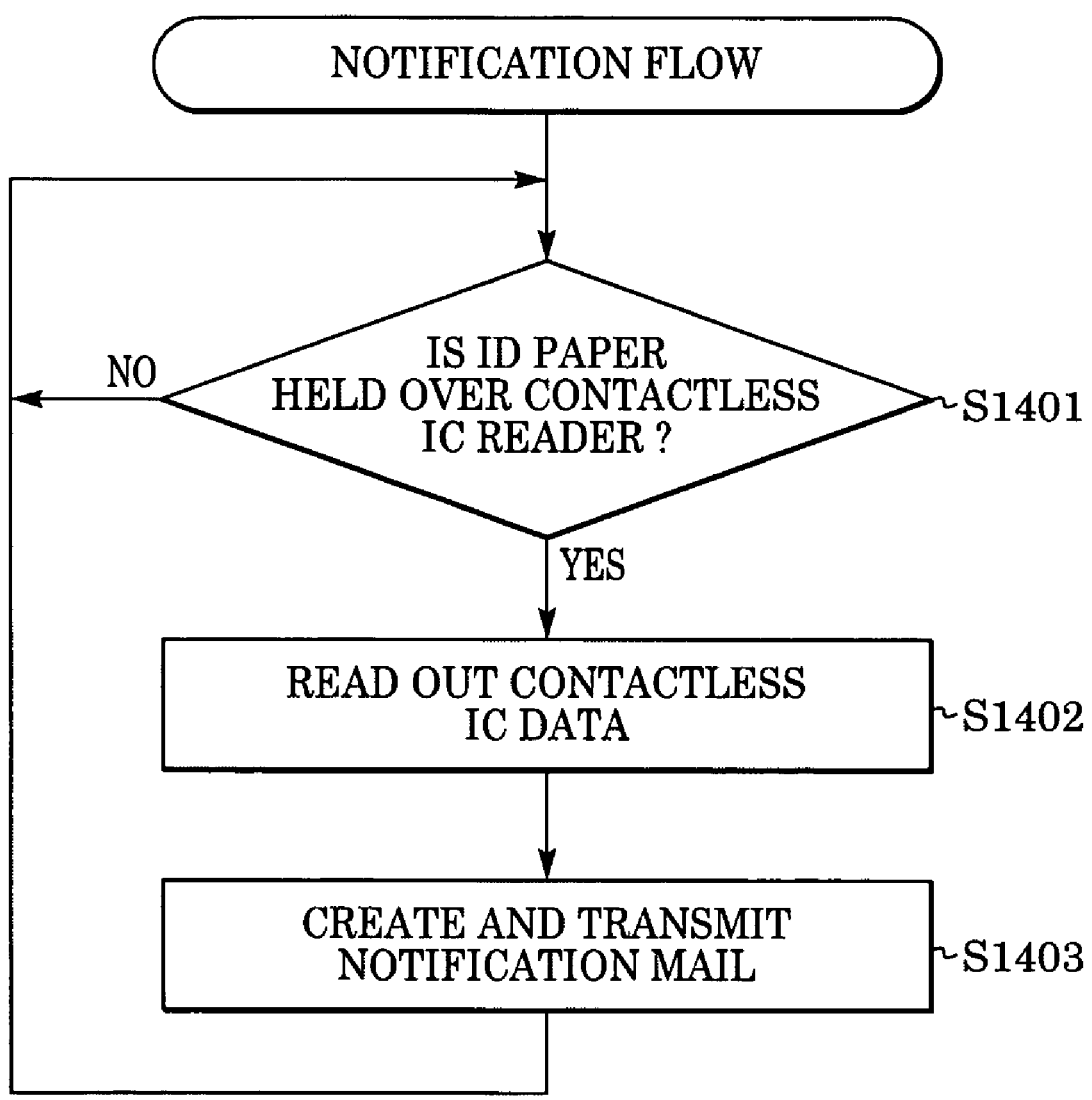

IMAGE FORMING APPARATUS, CONTROL METHOD FOR THE SAME, AND PROGRAM

BACKGROUND OF THE INVENTION

1. Field of the Invention

The present invention relates to an image forming apparatus, a control method for the image forming apparatus, a program and, in particular, to a technology for handling recording paper output to an output unit after an image is formed thereon.

2. Description of the Related Art

Recently, the use of multi function printers (MFPs) has been rapidly increasing. In MFPs, a copy machine is not only used for copying, but also for printing, scanning, and faxing. MFPs are also used as network printers which perform a printing process based on print jobs delivered from other apparatuses on the network.

When an MFP is used as a network printer, a user sometimes does not pick up the printout (printed document) outputted to an output unit of the MFP immediately after submitting the print job. This can result in a potential security problem, for example, a third person can view the printed document left in the output unit or can take it out.

In addition, if printed documents from a plurality of users are left in an output tray and end up mixed up together, it is difficult for a user to find the user's printed document. If, in order to find the user's printed document, the user picks up another user's printed document from the output tray and places it near the MFP, it is difficult for the other users to find their printed documents.

Furthermore, even if some user finds another user's printed document on the output tray or near the MFP and wants to inform the owner of the printed document, the user has no way to tell who is the owner of the printed document.

To solve these problems, Japanese Patent Laid-Open No. 2003-115957, for example, discloses an MFP having a secured printing function in which a job having a security code added by a print driver of a personal computer is submitted to the MFP and a printing process starts only by inputting the security code to the MFP.

Additionally, Japanese Patent Laid-Open No. 8-44255 discloses a technology that, when recording paper is left on an output tray for longer than a predetermined time period, a printer sends an e-mail to a user to whom the output tray is assigned in advance to notify the user that the recording paper is still there.

SUMMARY OF THE INVENTION

It is an aspect of the present invention to provide an image forming apparatus for writing job information associated with an image forming process to a contactless integrated chip (IC) attached to recording paper, and for reading out the job information from the contactless IC attached to recording paper left on an output tray after completion of an image forming process. Subsequently, the image forming apparatus, based on the readout job information, notifies the user who initiated the job of that fact that the recording paper is uncollected.

According to another aspect of the present invention, an image forming apparatus includes writing means for writing job information associated with an image forming process to a contactless IC attached to recording paper, reading means for reading out the job information written by the writing means from the contactless IC attached to recording paper remaining uncollected after completion of the image forming process, and notification means for notifying, based on the job information read out by the reading means, that the recording paper is uncollected after completion of the image forming process.

According to yet another aspect of the present invention, an image forming apparatus includes recording means for recording identification information (ID) for identifying recording paper and associated information about a user who initiated an image forming process, the ID being pre-recorded in a contactless IC attached to the recording paper, reading means for reading out the ID from the contactless IC attached to recording paper remaining uncollected after completion of the image forming process, and notification means for notifying the user recorded in association with the ID read out by the reading means that the recording paper is uncollected.

According to still yet another aspect of the present invention, an image forming method includes a writing step for writing job information associated with an image forming process to a contactless IC attached to recording paper, a reading step for reading out the job information written in the writing step from the contactless IC attached to recording paper remaining uncollected after completion of the image forming process; and a notification step for notifying, based on the job information read out in the reading step, that the recording paper is uncollected after completion of the image forming process.

According to another aspect of the present invention, an image forming method includes a recording step for recording an ID for identifying recording paper and associated information about a user who initiated an image forming process, the ID being pre-recorded in a contactless IC attached to the recording paper, a reading step for reading out the ID from the contactless IC attached to recording paper remaining uncollected after completion of the image forming process, and a notification step for notifying the user recorded in association with the ID read out by the reading step that the recording paper is uncollected.

Another aspect of the present invention includes computer-executable process steps for controlling an image forming apparatus, the steps comprising writing job information associated with an image forming process to a contactless IC attached to recording paper, reading out the job information written in the writing step from the contactless IC attached to recording paper remaining uncollected after completion of the image forming process; and notifying, based on the job information read out in the reading step, that the recording paper is uncollected after completion of the image forming process.

According to another aspect of the present invention computer-executable process steps for controlling an image forming comprise recording an ID for identifying recording paper and associated information about a user who initiated an image forming process, the ID being pre-recorded in a contactless IC attached to the recording paper, reading out the ID from the contactless IC attached to recording paper remaining uncollected after completion of the image forming process; and notifying the user recorded in association with the ID read out by the reading step that the recording paper is uncollected.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9A shows job information items which correspond to first, second, and fourth embodiments; and FIG. 9B shows target-of-notification information items which correspond to the first to fourth embodiments.

FIGS. 10A and 10B show a notification message format and an example of a notification message, respectively.

FIG. 11 is a flow chart of a print process according to a second embodiment of the present invention.

FIGS. 12A and 12B show job information items according to a third embodiment of the present invention.

FIG. 14 is a flow chart of a notification process according to a fourth embodiment of the present invention.

DESCRIPTION OF THE EMBODIMENTS

Embodiments of the present invention will be described below in detail with reference to the accompanying drawings.

First Embodiment

Figure 1:
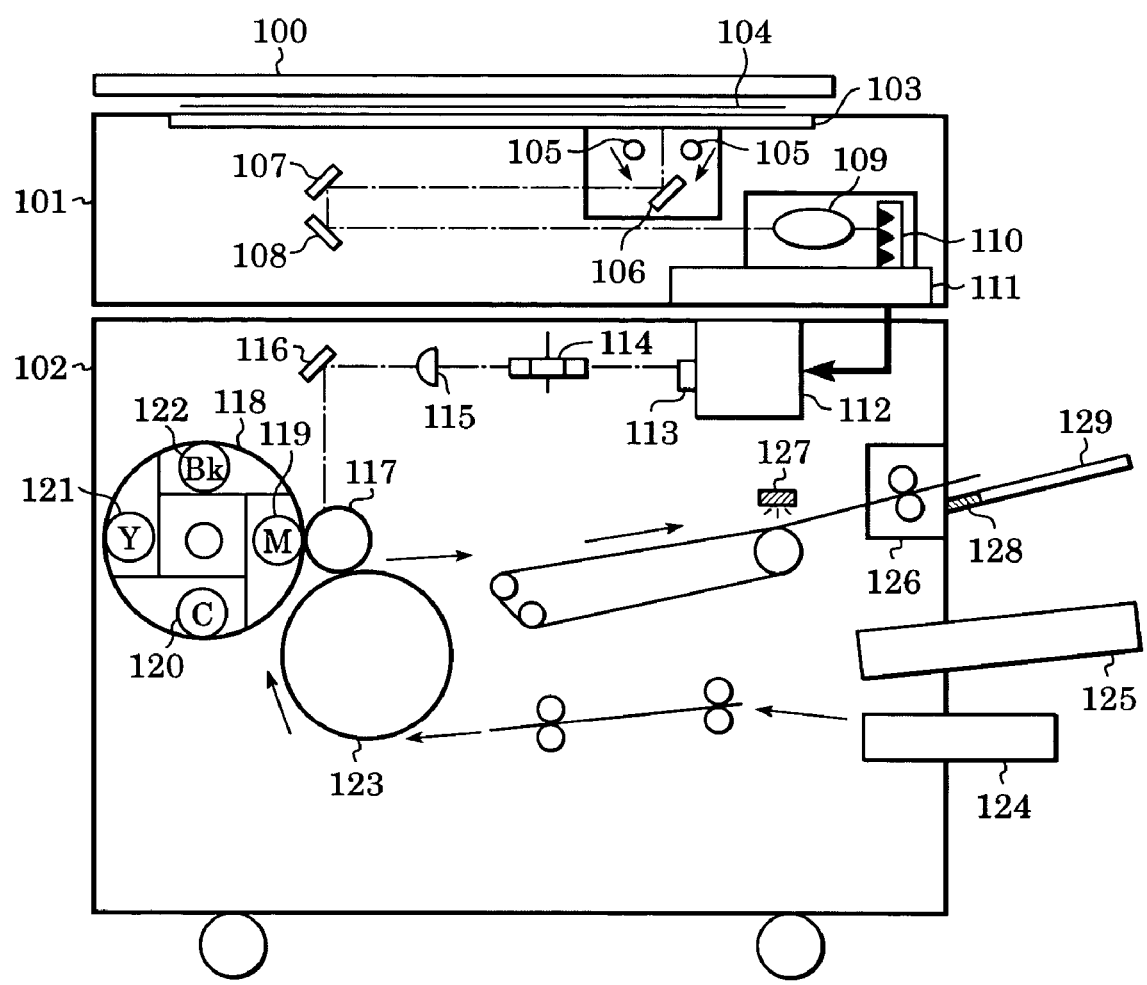
FIG. 1 is a schematic sectional view of the mechanical structure of an MFP according to the present invention.

FIG. 1 is a schematic sectional view of the mechanical structure of an MFP according to the present invention. As shown in FIG. 1, an MFP 100 includes an image reader unit 101 for capturing a document image and a printer unit 102 for printing the image data captured by the image reader unit 101 or externally input data. The image reader unit 101 captures a document image, for example, at 400 dots/inch (dpi) and performs digital signal processing on the image. The printer unit 102 prints an image corresponding to image data output from the image reader unit 101, for example, at 1200 dpi.

The image reader unit 101 performs exposure scanning of a document 104 placed on a document glass 103 by moving an illumination lamp 105. During exposure scanning, a reflected light image from the document 104 is directed onto a 3-line CCD sensor 110 through mirrors 106, 107, and 108, and a lens 109. The 3-line CCD sensor 110 photoelectrically converts the reflected light image to color components, red (R), green (G), and blue (B), and transfers them to a signal processing unit 111 as electronic color image signals. During exposure scanning of the document image, the lamp 105 and the mirror 106 are controlled to move at twice the speed of the mirrors 107 and 108.

The signal processing unit 111 converts the R, G, and B image signals input from the 3-line CCD sensor 110 to magenta (M), cyan (C), yellow (Y), and black (Bk) image signals, and transfers them to a laser driver 112 of the printer unit 102. During one exposure scanning of the document image, an image signal associated with one of the M, C, Y, and Bk color components is transferred to the laser driver 112, and therefore, four exposure scannings are executed for one document image.

The laser driver 112 modulates laser beams emitted from an oscillating semiconductor laser 113 based on the image signals transferred from the signal processing unit 111 or image signals input from an NIC 311, which will be described below. The laser beams emitted from the oscillating semiconductor laser 113 are directed onto a photoconductor drum 117 through a polygon mirror 114, an f-θ lens 115, and a mirror 116. At that moment, the laser beams are scanned by the polygon mirror 114 in the main scan direction of the photoconductor drum 117, thereby forming an electrostatic latent image on the photoconductor drum 117.

A rotating developer 118 includes a magenta developer unit 119, a cyan developer unit 120, a yellow developer unit 121, and a black developer unit 122. These four developer units are cyclically brought into contact with the photoconductor drum 117, and sequentially develop electrostatic latent images corresponding to magenta (M), cyan (C), yellow (Y), and black (Bk) with the corresponding colored toner. A sheet of recording paper fed from a paper cassette 124 or 125 is wrapped around a transfer drum 123, and M, C, Y, and Bk toner images sequentially formed on the photoconductor drum 117 are transferred onto the sheet of recording paper.

Thus, by repeating processes of forming an electrostatic latent image, developing the image, and transferring the image for respective M, C, Y, and Bk image signals, M, C, Y, and Bk toner images are transferred to the same sheet of recording paper one on top of the other to produce a full-color image. The sheet of recording paper on which the full-color image is formed is separated from the transfer drum 123, and the toner images are fused onto the sheet of recording paper by a fuser unit 126. Then, the sheet of recording paper is delivered to an output tray 129.

Figure 2:
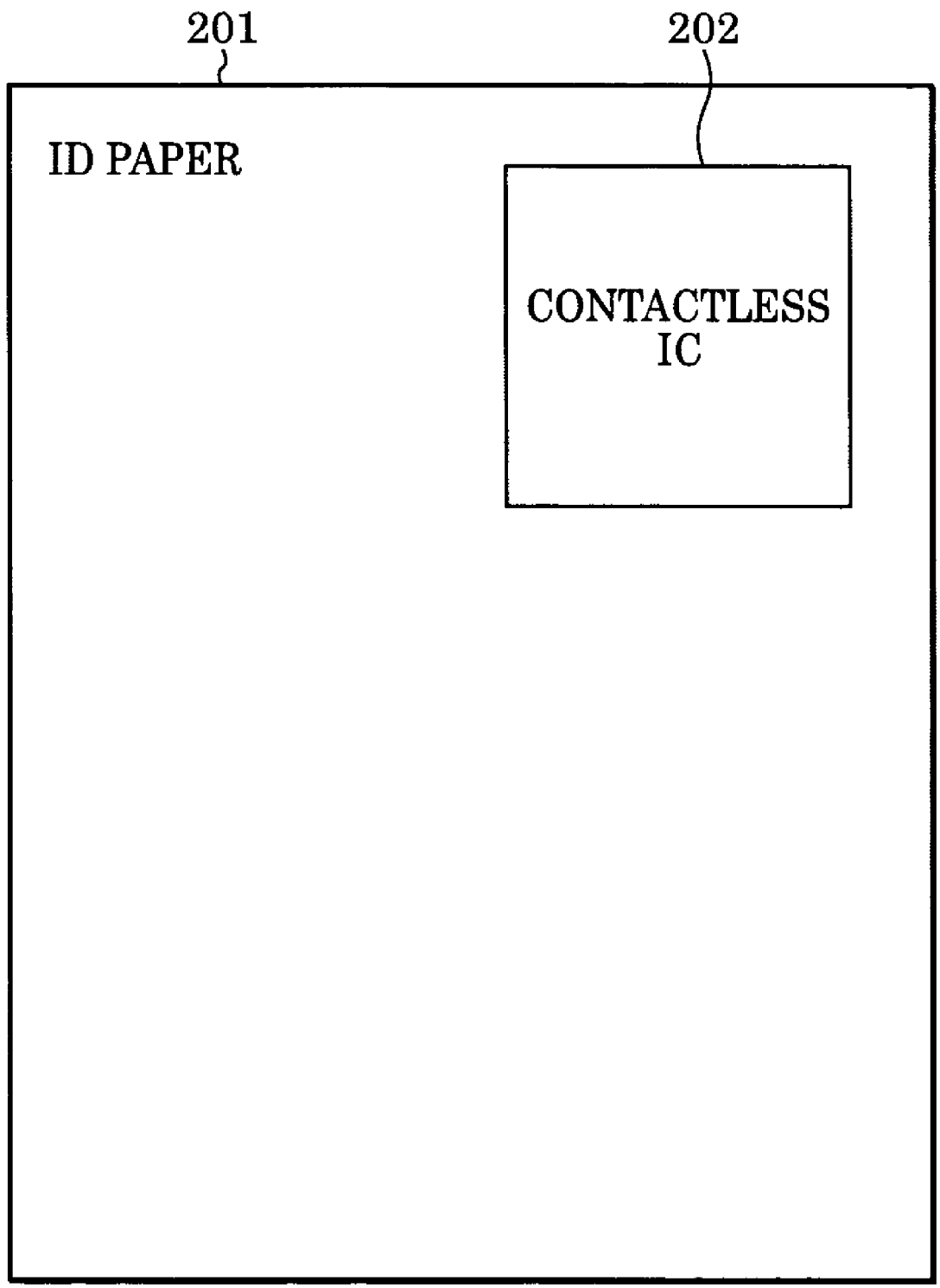
FIG. 2 shows recording paper (ID paper) to which a contactless IC is attached.

As shown in FIG. 2, the MFP 100 can use an ID paper 201 having an embedded contactless IC (e.g., RFID tag) 202, which will be described below, as the recording paper. Turning back to FIG. 1, a contactless IC writer 127, which is located before the fuser unit 126, writes predetermined data to the contactless IC 202. The predetermined data written to the contactless IC 202 by the contactless IC writer 127 is read out by a contactless IC reader 128, and is delivered to a notification process, as will be described below. The positions of the contactless IC writer 127 and the contactless IC reader 128 within the MFP 100 are not limited to those illustrated in FIG. 1. Any location within the MFP 100 that would enable practice of the present invention is applicable.

Figure 3:
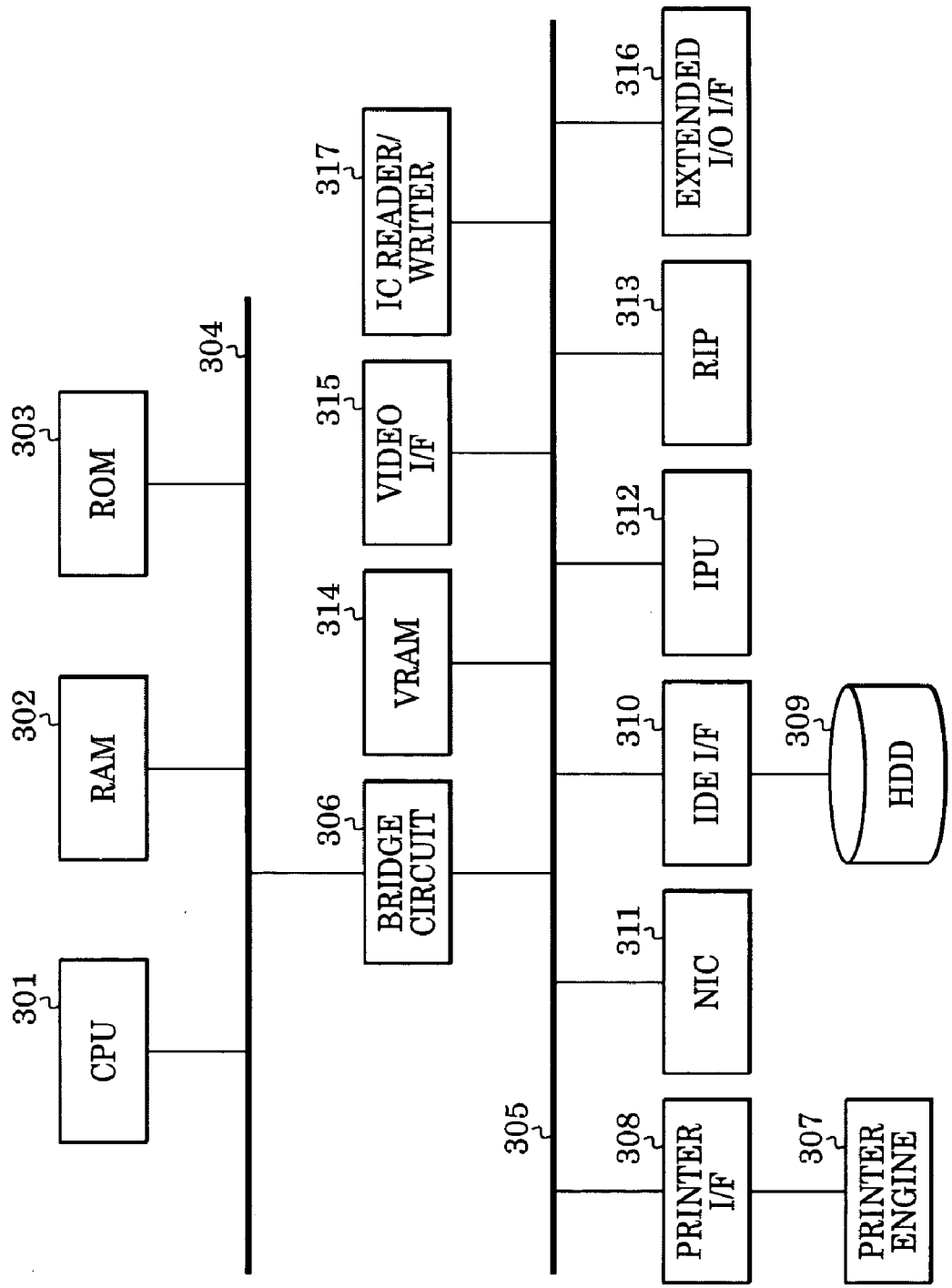
FIG. 3 is a block diagram of the hardware configuration of a control unit in a printer unit.

The hardware configuration of a control unit of the printer unit 102 will be described next with reference to FIG. 3.

The control unit of the printer unit 102 includes a local bus 304 and an I/O bus 305, both of which are connected with a bridge circuit 306. A CPU 301, a RAM 302, and a ROM 303 are connected to the local bus 304. A printer interface (I/F) 308, a hard disk interface (IDE I/F) 310, a network interface controller (NIC) 311, an image processing unit (IPU) 312, a raster image processor (RIP) 313, a video RAM (VRAM) 314, a video I/F 315, an extended I/O I/F 316, and an IC reader/writer 317 are connected to the I/O bus 305. A printer engine 307 is connected to the printer I/F 308. A hard disk drive (HDD) 309 is connected to the IDE I/F 310.

The CPU 301 loads a system program and an application program stored in the HDD 309 into the RAM 302 by a boot program stored in the ROM 303 and carries out various types of control in the printer unit 102 by using cooperative processing of the system program and the application program. The RAM 302 is also used for a work area to temporarily store arithmetic results from the CPU 301 and image data. The ROM 303 also stores font data used for converting character code data to character image data and a notification message format (refer to FIG. 10A), which will be described below.

The bridge circuit 306 is used for switching off the connection between the local bus 304 and the I/O bus 305. This switching-off function, for example, allows the CPU 301 to access the RAM 302 and the ROM 303 via the local bus 304 while the printer I/F 308 transfers image data to the RIP 313 via the I/O bus 305.

The printer engine 307 corresponds to the above-described printer unit 102. The printer I/F 308 connects the printer engine 307 to the I/O bus 305, and transfers image data stored in the RAM 302 to the laser driver 112 of the printer engine 307 in response to an instruction from the CPU 301. The IDE I/F 310 accesses the HDD 309 under the control of the CPU 301. Additionally, the HDD 309 stores application programs corresponding to flow charts shown in FIGS. 7, 8, 11, 13, and 14, which will be described below, notification destination information shown in FIG. 9B, and the notification message format shown in FIG. 10A. Furthermore, the image data are spooled in the HDD 309.

The NIC 311 is used for transmitting and receiving image data to and from an external device, such as a personal computer, via a network, such as a local area network. The IPU 312 carries out image processing, such as resolution conversion. The RIP 313, under the control of the CPU 301, converts image data associated with a page description language (PDL) transferred from an external device via the NIC 311 into a bitmap image, and loads the bitmap image into the RAM 302.

Display data to be displayed on a display panel of an operation unit (not shown) is written into the video RAM 314, and is output to the display panel via the video I/F 315. The extended I/O I/F 316 allows the CPU 301 to communicate with, for example, a mobile phone (not shown), and has a function for transmitting an e-mail.

The IC reader/writer 317 corresponds to one of the contactless IC writer 127 and the contactless IC reader 128 shown in FIG. 1 or to both of them. The IC reader/writer 317 accesses data on the contactless IC 202 on the ID paper (recording paper) 201 over the radio. The IC reader/writer 317 will be described below in detail with reference to FIG. 5.

Figure 4:
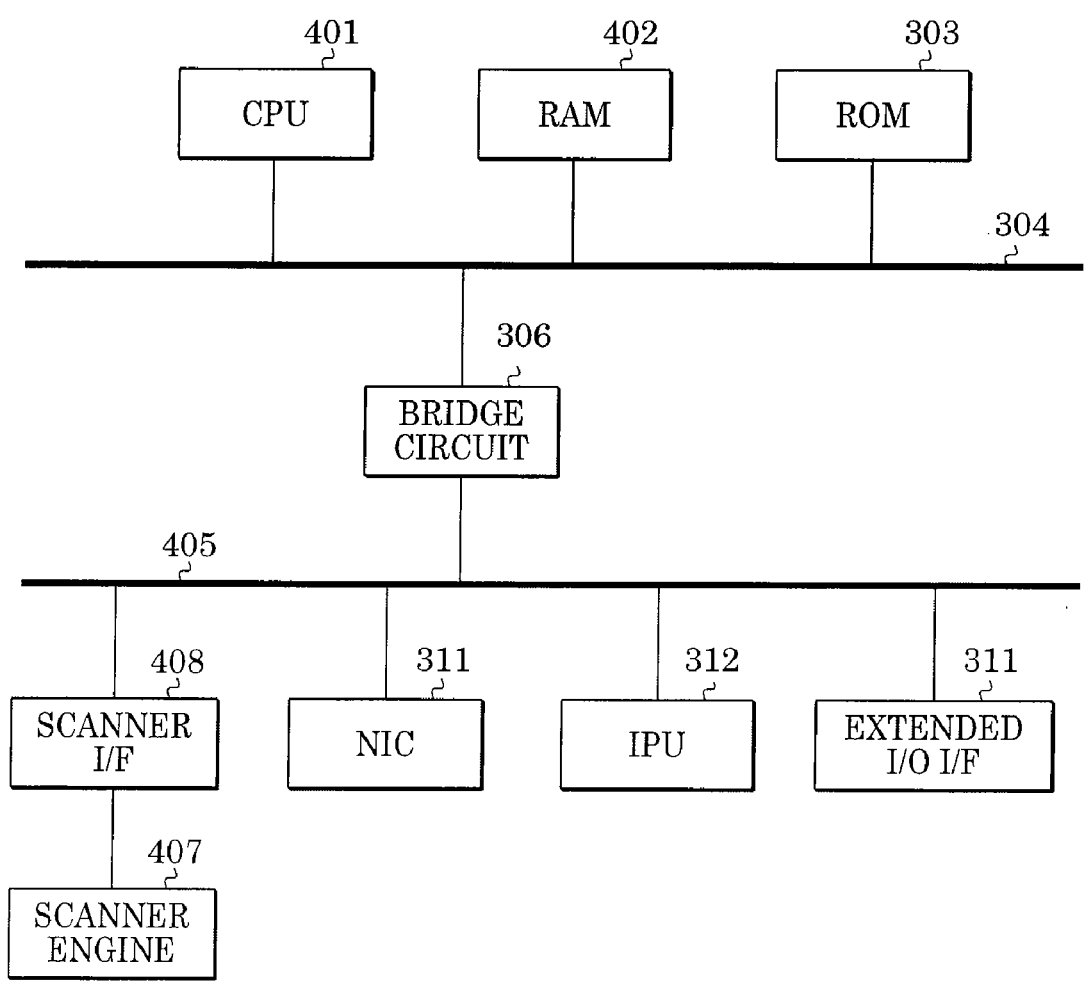
FIG. 4 is a block diagram of the hardware configuration of a control unit in an image scanner unit.

FIG. 4 is a block diagram illustrating the hardware configuration of a control unit of the image reader unit 101. As shown in FIG. 4, since the control unit of the image reader unit 101 has the same devices as in the control unit of the printer unit 102 shown in FIG. 3, only the differences will be described briefly.

The control unit of the image reader unit 101 does not include devices corresponding to the raster image processor (RIP) 313, the video RAM 314, the video I/F 315, and the IC reader/writer 317 in the control unit of the printer unit 102. Instead of the printer I/F 308 and the printer engine 307, the control unit of the image reader unit 101 has a scanner I/F 408 and a scanner engine 407, respectively. These are the differences from the control unit of the printer unit 102.

The scanner engine 407 corresponds to the above-described image reader unit 101. The scanner I/F 408 connects the scanner engine 407 to an I/O bus 405, and transfers image data output from the scanner engine 407 to a RAM 402 in response to an instruction from a CPU 401.

Figure 5:
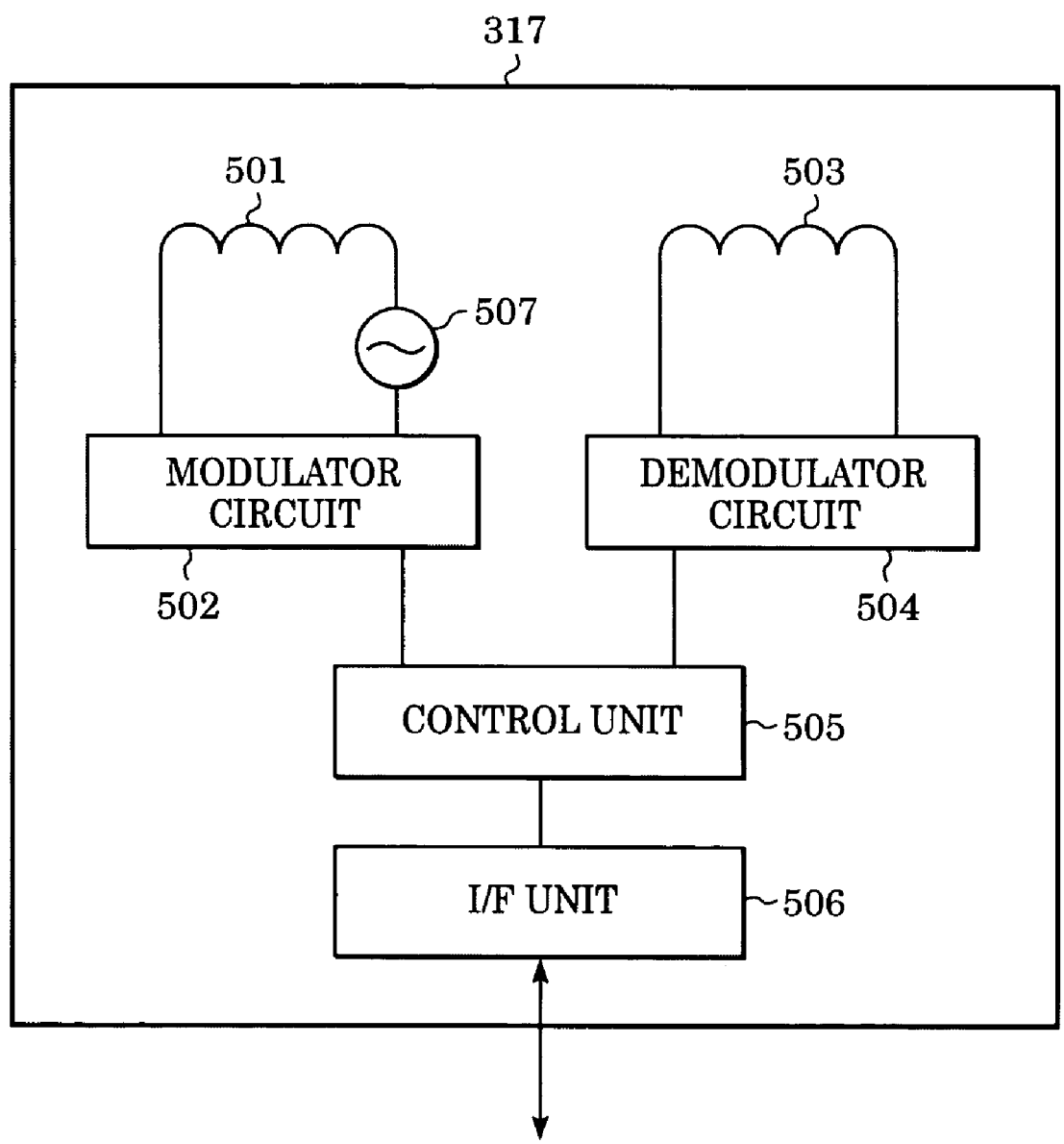
FIG. 5 is a block diagram of an IC reader and writer.

FIG. 5 is a block diagram of the IC reader/writer 317. The IC reader/writer 317 includes a transmitting antenna unit 501 for transmitting radio wave signals, a modulator circuit 502 for modulating data signals transmitted from the transmitting antenna unit 501, a receiving antenna unit 503 for receiving radio wave signals, a demodulator circuit 504 for demodulating the radio wave signals received by the receiving antenna unit 503, an I/F unit 506 for communicating with devices other than the contactless IC 202 (e.g., the CPU 301 in this embodiment), and the control unit 505. The control unit 505 controls the above-described transmitting antenna unit 501, modulator circuit 502, receiving antenna unit 503, demodulator circuit 504, and I/F unit 506. Additionally, an alternating current power supply 507 is connected to the transmitting antenna unit 501 to constantly transmit radio waves for generating electric power.

The control unit 505, in response to an instruction from the CPU 301, modulates radio waves for supplying electric power and data to be transmitted by using the modulator circuit 502, and transmits the radio waves via the transmitting antenna unit 501. In addition, the control unit 505 can demodulate radio waves received by the receiving antenna unit 503 using the demodulator circuit 504, and then can convert the radio waves to data signals.

Figure 6:
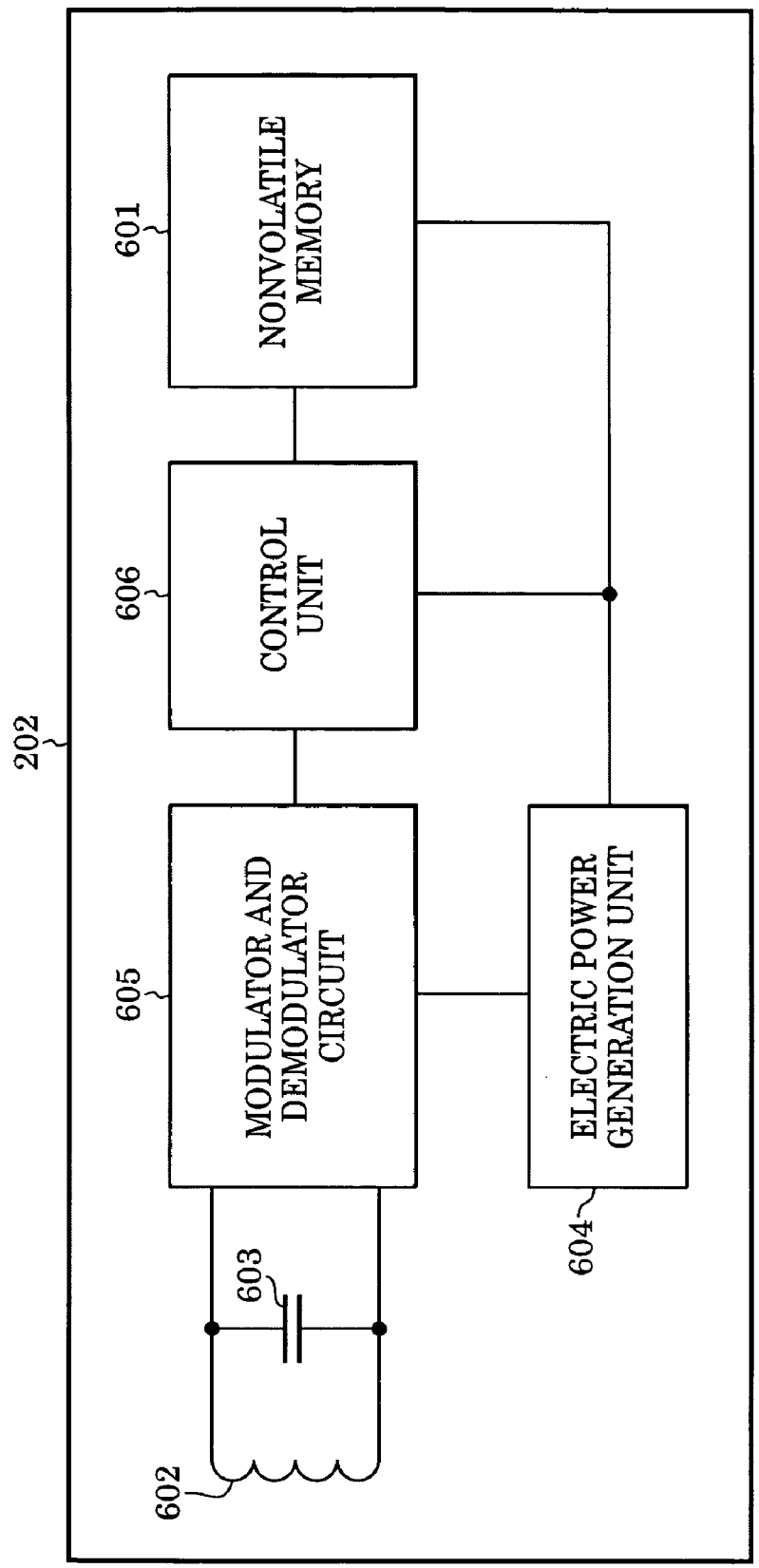
FIG. 6 is a block diagram of a contactless IC.

FIG. 6 is a block diagram of the contactless IC 202. The contactless IC 202 is also referred to as a RFID tag or a data carrier. The contactless IC 202 can communicate with the IC reader/writer 317 via radio waves, that is, without any physical contacts.

In this embodiment, the contactless IC 202 is of the μ-chip type having an ultra small size. As shown in FIG. 2, this contactless IC 202 is embedded in the ID paper 201. However, the contactless IC 202 of a label type may be adhered to a sheet of recording paper (the ID paper 201). When the contactless IC 202 is attached to the recording paper in such a way, the contactless IC 202 is preferably positioned at one of the four corners or in page margins of the ID paper 201.

As shown in FIG. 6, the contactless IC 202 includes a nonvolatile memory 601, an antenna unit 602 for transmitting and receiving radio waves, a resonance capacitor unit 603, an electric power generation unit 604 for rectifying and smoothing electrical currents, a modulator and demodulator circuit 605 for modulating and demodulating the radio waves, and a control unit 606. The contactless IC 202 has no power supply, such as a battery, and electric power is generated based on radio waves supplied from the IC reader/writer 317.

That is, the antenna unit 602 forms a resonance circuit along with the resonance capacitor unit 603, while the IC reader/writer 317 constantly emits radio waves (i.e., an alternating magnetic field) for generating electric power. When the contactless IC 202 is held over the IC reader/writer 317, the above-described resonance circuit produces an induced current due to electromagnetic induction. The induced current is output to the electric power generation unit 604, which rectifies and smoothes the induced current to generate electric power having a predetermined voltage.

The electric power is supplied to the nonvolatile memory 601, the control unit 606, and the modulator and demodulator circuit 605.

The IC reader/writer 317 simultaneously transmits the radio wave signals for generating electric power and radio waves signals associated with various types of data. The radio wave signals associated with the data are demodulated by the modulator and demodulator circuit 605, and are stored in the nonvolatile memory 601 under the control of the control unit 606. Additionally, the control unit 606 reads out data in the nonvolatile memory 601, modulates the data using the modulator and demodulator circuit 605, and transmits them as radio wave signals via the antenna unit 602.

Figure 7:
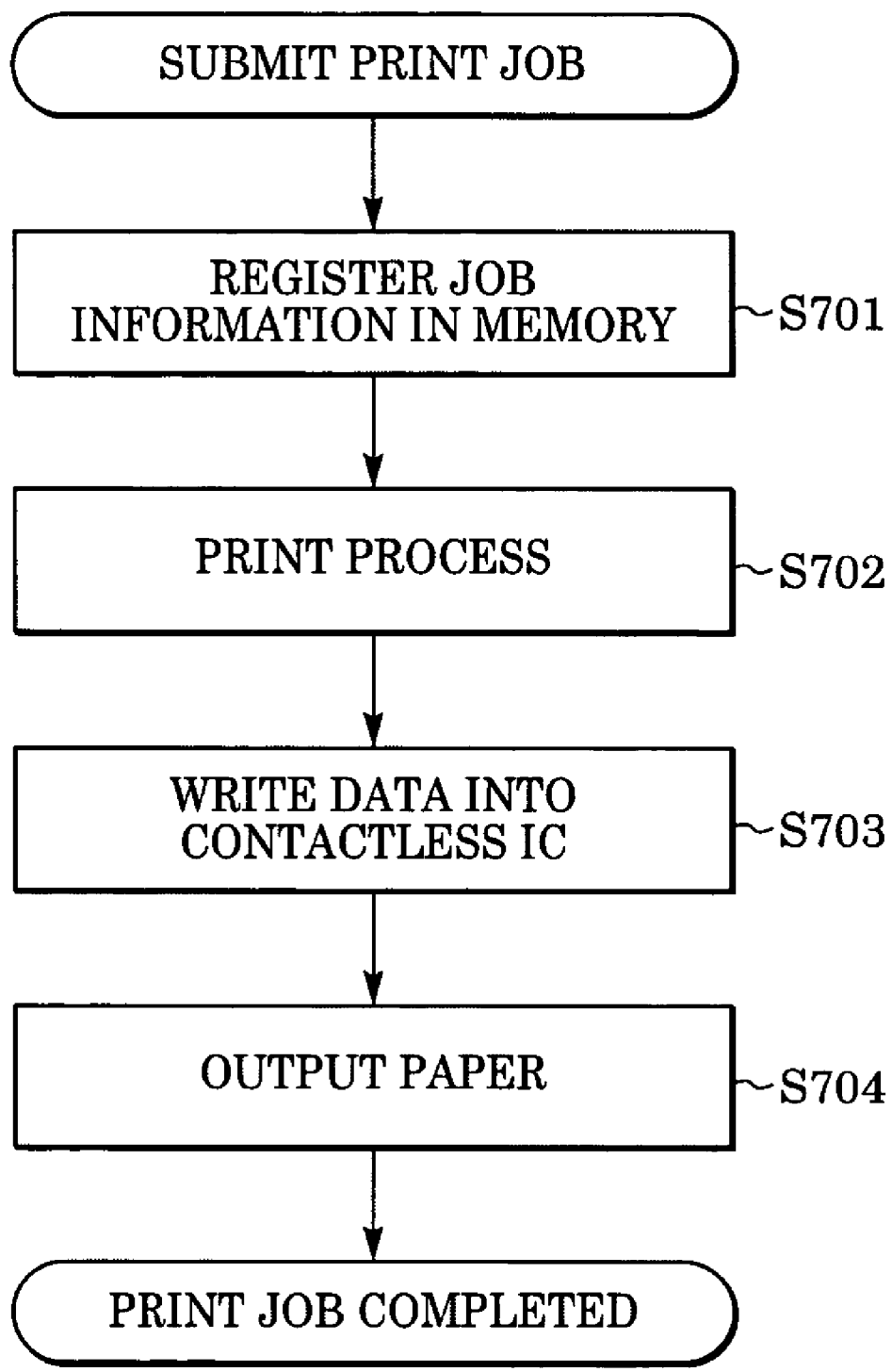
FIG. 7 is a flow chart of the outline of a print process according to a first embodiment of the present invention.

The outline of the print process according to the first embodiment will be described next with reference to a flow chart shown in FIG. 7.

Upon receiving an image print command and image data in a page description language (hereinafter these two are collectively referred to as a print job) from a personal computer (not shown) connected to a network via the NIC 311, the CPU 301 of the printer unit 102 creates a unique print job ID and registers job information, as shown in FIG. 9A, in the RAM 302 (step S701). The job information includes the above-described print job ID, the name of the user who submitted the print job, a job execution time (i.e., the time at which the print job is submitted), a file name associated with the print job, and a next-notification timing, which is an interval between the job execution time and the next notification time. This information is grouped into one record, which is recorded in the RAM 302. For example, it is presumed that notification is performed at intervals of 30 minutes after a print job is submitted. When a user "yoshida" submits a print job that prints out a document having a file name "zzz.doc" at time 13:15, the third record from the top shown in FIG. 9A is added and registered in the RAM 302.

Subsequently, the CPU 301, in response to the print job instruction, transfers image data associated with the above-described page description language to the RIP 313 to convert the image data to bitmap image data. The bitmap image data is transferred to the IPU 312 and is image-processed. Then, the data is transferred to the printer unit 102 to be printed (step S702). In this print process, the CPU 301 executes control so that the ID paper 201 fed from the paper cassette 124 or 125 is wrapped around the transfer drum 123 and a toner image on the photoconductor drum 117 is transferred to the ID paper 201.

Subsequently, the CPU 301 causes the ID paper 201 to be separated from the transfer drum 123 and to move to the fuser unit 126. The CPU 301 also transmits the corresponding print job ID to the contactless IC writer 127, and causes the contactless IC writer 127 to write the print job ID to the contactless IC 202 attached to the ID paper 201 (step S703). For example, if a print job in the third record from the top shown in FIG. 9A is submitted, a print job ID "2492" registered in the third record is written to the contactless IC 202 on the ID paper 201.

Thereafter, the CPU 301 causes the fuser unit 126 to fuse the toner image transferred to the ID paper 201, and then to output the printed ID paper 201 onto the output tray 129 (step S704).

The notification process that notifies a user of the printed ID paper 201 remaining uncollected will be described next with reference to a flow chart shown in FIG. 8. The notification process and the above-described print process are independently carried out.

In the notification process, the CPU 301 operates the contactless IC reader 128 located on the output tray 129 at predetermined intervals. If, a predetermined time has elapsed (step S801), then the contactless IC reader 128 reads out a print job ID written to the contactless IC reader 202 on the ID paper 201 output on the output tray 129 (step S802).

If no ID paper 201 exists on the output tray 129 and no print job ID can be read out, the CPU 301 presumes that all the printout ID paper 201 has been removed from the output tray 129 (step S803), and therefore, deletes job information associated with all the records in the RAM 302 (step S809). The process then returns to step S801.

If however, ID paper 201 exists on the output tray 129 and at least one print job ID can be read out (step S803), the CPU 301 selects one of the readout print job IDs and calculates the difference between a job execution time corresponding to the print job ID and the current time (S804). That is, the CPU 301 calculates an elapsed time from the execution time of the print job.

Subsequently, the CPU 301 determines whether the elapsed time from the execution time of the print job is greater than next-notification timing (i.e., the next notification interval) corresponding to the print job ID (step S805). That is, whether the current time has passed the next notification time. If the current time has not passed the notification time, the CPU 301 carries out the process of step S808, which is described below.

If the current time has passed the next notification time, the CPU 301 creates a notification message, as shown in FIG. 10B, informing the user that the ID paper 201 is on the output tray 129 by using a notification message format shown in FIG. 10A in the ROM 303 and job information shown in FIG. 9A in the RAM 302. The CPU 301 then sends an e-mail to the user who submitted the print job based on mail address information shown in FIG. 9B (step S806).

Subsequently, the CPU 301 updates the timing of the next notification in the job information associated with the notification process by a predetermined method (step S807), and the process proceeds to step S808. For example, if the notification interval is 30 minutes after a print job is submitted, a first notification for the print job "2489" is carried out at 13:15, which is 30 minutes after the job execution time of 12:45. As shown in FIG. 9A, the next-notification timing for the print job ID "2489" in the RAM 302 is updated from "0:30 (30 minutes)" to "1:00 (1 hour)". This update process of the next-notification timing allows an e-mail, informing the user that the ID paper 201 is still on the output tray 129, to be sent again in 30 minutes if the ID paper 201 is not removed from the output tray 129.

The notification e-mail can be sent to any device, e.g., personal computer, PDA, etc., that would enable the user to receive the e-mail.

At step S808, the CPU 301 determines whether ID paper of another print job exists on the output tray 129. If it is determined that the ID paper of another print job exists on the output tray 129, then the process returns to step S804 and steps S804 to S807 are repeated for that print job. On the other hand, if it is determined that there is no other print job on the output tray 129, the present print job information is deleted and the process returns to step S801.

Thus, in the first embodiment, the contactless IC writer 127 writes a print job ID onto the contactless IC 202 attached to the printed ID paper 201. A user name, a file name, a job execution time, and next-notification timing are managed for each print job ID. Furthermore, an e-mail address of each user is registered in advance. The contactless IC reader 128 automatically detects that the ID paper 201 is on the output tray 129 by reading out a print job ID from the contactless IC 202 on the ID paper 201 output onto the output tray 129. An e-mail message informing the user that the ID paper 201 is uncollected is automatically created and sent to the user who submitted the print job.

Accordingly, the first embodiment can encourage an owner of recording paper that is output to an output unit after forming an image to promptly pick up the recording paper. In other words, it simply and reliably prevents printed recording paper from being left on an output tray for an extended period time, and therefore, aides in preventing the printed recording paper from being viewed or removed by someone other than the person who printed it. Also, the mixing of printed documents associated with different users can also be prevented.

As described, in the first embodiment, a print job ID is written to the contactless IC 202 on the ID paper 201. However, in another embodiment, a user name may be written instead of the print job ID.

Second Embodiment

In the first embodiment, only a print job ID is written to the contactless IC 202 attached to the ID paper 201. In a second embodiment, in addition to the print job ID, all the information shown in FIG. 9A, such as a user name, a file name, a job execution time, and a timing of the next notification, are written to the contactless IC 202. Additionally, in the second embodiment, a contactless IC reader/writer (not shown) is used instead of the contactless IC reader 128 located on the output tray 129 as described in the first embodiment.

An outline of the print process according to the second embodiment will be described next with reference to the flow chart shown in FIG. 11.

Upon receiving a print job from a personal computer connected to a network via the NIC 311, the CPU 301 of the printer unit 102 creates a unique print job ID, and registers the print job ID in the RAM 302. Also, the CPU 301, in response to the print job instruction, transfers image data to the RIP 313 to convert the image data to bitmap image data. The bitmap image data is transferred to the IPU 312 and is image-processed. Then, the data is transferred to the printer unit 102 to be printed (step S1101).

Subsequently, the CPU 301 causes the ID paper 201 to be separated from the transfer drum 123 and moved to the fuser unit 126. The CPU 301 transmits the corresponding print job ID, user name, file name, job execution time, and next-notification timing to the contactless IC writer 127, and causes the contactless IC writer 127 to write this information to the contactless IC 202 attached to the ID paper 201 (step S1102).

Thereafter, the CPU 301 causes the fuser unit 126 to fuse the toner image transferred to the ID paper 201, and then to output the printed ID paper 201 onto the output tray 129 (step S1103).

In the second embodiment, job information for each print job, as shown in FIG. 9A, need not be stored in the RAM 302 to be managed, and therefore, the amount of memory can be reduced.

Figure 8:
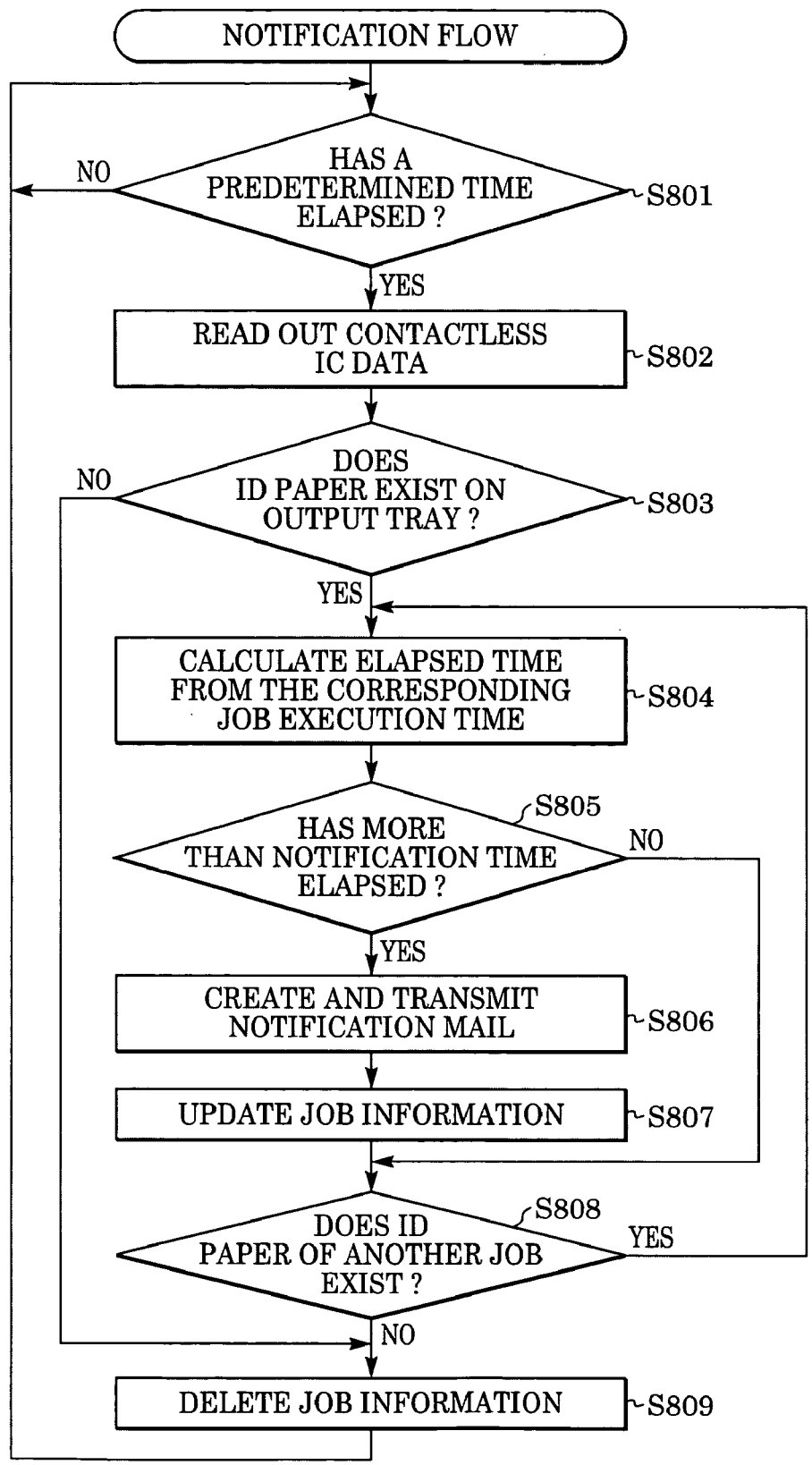
FIG. 8 is a flow chart of a notification process according to the first embodiment of the present invention.

The notification process according to the second embodiment is substantially identical to that shown in the flow chart of FIG. 8. Only the difference will be briefly described without referring to a flow chart.

As described above, job information for each print job is not stored in the RAM 302. Accordingly, the difference between the first embodiment and the current embodiment is that deletion of the print job information (step S809 of FIG. 8), is eliminated in the present embodiment.

Another difference is that, in the present embodiment, a notification message is created using the print job ID, user name, file name, job execution time, and next-notification timing read from the contactless IC 202 on the ID paper 201, instead of the job information which is used in the first embodiment.

Still another difference is that, although the CPU 301 carries out the update process for the next-notification timing stored in the RAM 302 in the first embodiment, the contactless IC reader/writer, under the control of the CPU 301, carries out the update process for the next-notification timing stored in the contactless IC 202 on the ID paper 201 in the present embodiment.

In the present embodiment, the print job ID, user name, file name, job execution time, and next-notification timing are written to the contactless IC 202 on the ID paper 201. However, all the information need not be written to the contactless IC 202. To carry out the above-described notification process, the print job ID need not necessarily be written to the contactless IC 202.

Third Embodiment

In the first and second embodiments, information is written to the contactless IC 202 on the ID paper 201. In contrast, in the third embodiment, a read-only serial ID pre-recorded in the contactless IC 202 on the ID paper 201 is used, where the read-only serial ID is used for identifying the ID paper 201. Thus, since no information is written to the contactless IC 202 on the ID paper 201, the MPF 100 of the present embodiment does not require contactless IC readers.

Figure 13:
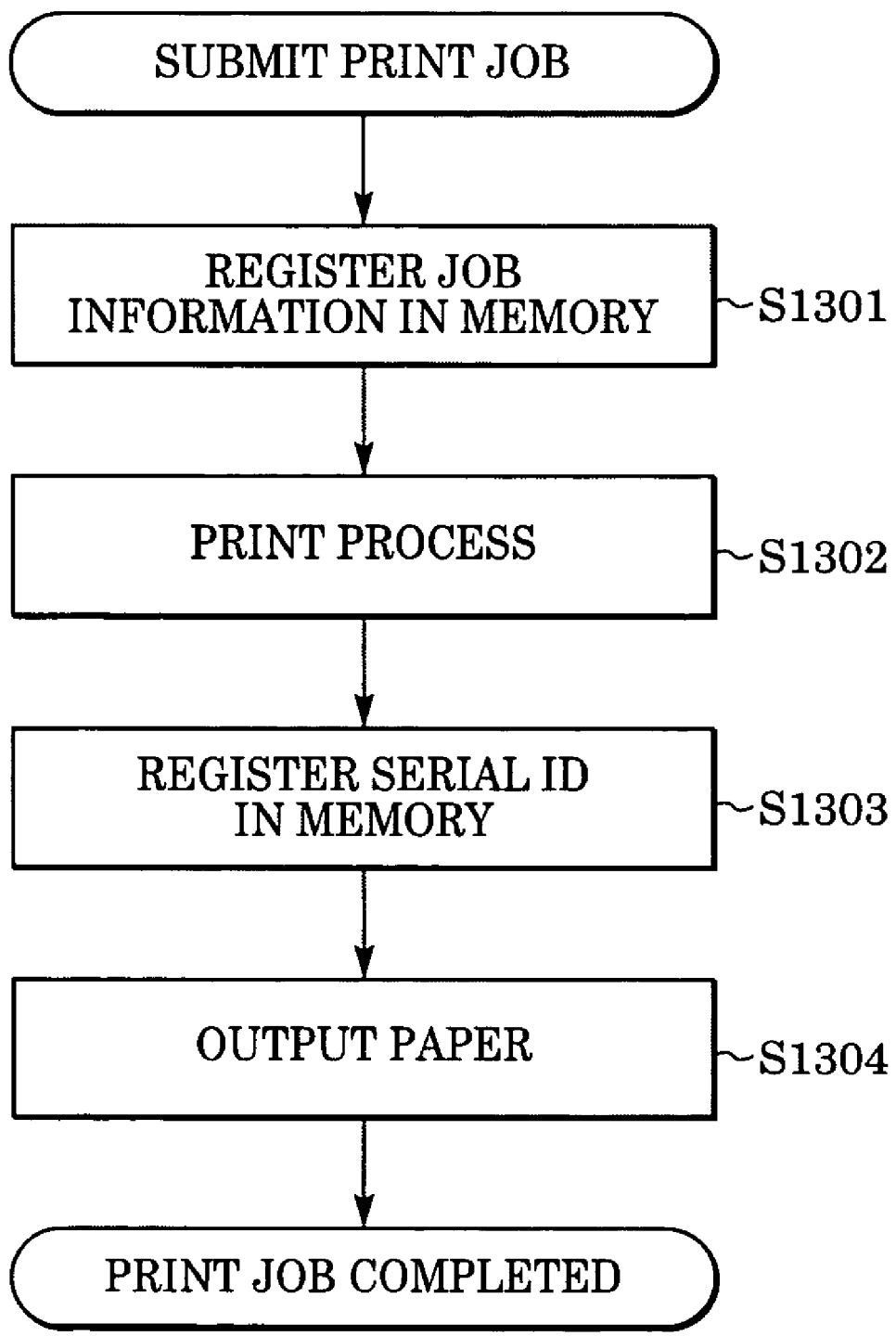
FIG. 13 is a flow chart of a print process according to the third embodiment of the present invention.

The print process according to the present embodiment will be described next with reference to a flow chart shown in FIG. 13.

Upon receiving a print job from a personal computer connected to a network via the NIC 311, the CPU 301 of the printer unit 102 creates a unique print job ID and registers job information, as shown in FIG. 12A, in the RAM 302 (step S1301). At this moment, the job information includes, as in the third record associated with the job ID "2492", the above-described print job ID, the name of a user who submits the print job, a file name associated with the print job, a job execution time at which the print job is submitted, and a next-notification timing, which is an interval between the job execution time and the next notification time. The serial ID, however, is not included in the job information.

Subsequently, the CPU 301, in response to the print job instruction, transfers image data to the RIP 313 to convert the image data to bitmap image data. The bitmap image data is transferred to the IPU 312 and is image-processed. Then, the data is transferred to the printer unit 102 to be printed (step S1302).

Thereafter, the CPU 301 causes the ID paper 201 to be separated from the transfer drum 123 and to move to the fuser unit 126. The CPU 301 also causes the contactless IC reader located in the vicinity of the fuser unit 126 to read the serial ID in the contactless IC 202 on the ID paper 201. The serial ID is registered in a record associated with the print job ID in the RAM 302 (step S1303). As shown by the third record in FIG. 12B, if a plurality of sheets of the ID paper 201 printed in the print job associated with the print job ID exists, every time each sheet of the ID paper 201 is transferred to the vicinity of the fuser unit 126, each serial ID written in the contactless IC 202 on the sheet of the ID paper 201 is registered in association with the print job ID.

Subsequently, the CPU 301 causes the fuser unit 126 to fuse the toner image transferred to the ID paper 201, and then to output the printed ID paper 201 onto the output tray 129 (step S1304).

The notification process according to the third embodiment is substantially identical to that shown by the flow chart in FIG. 8 for the first embodiment. Only the difference will be briefly described without referring to a flow chart.

The difference in the notification process of the present embodiment from that of the first embodiment is that, since only the serial ID is recorded on the contactless IC on the ID paper 201 in the present embodiment, the contactless IC reader located on the output tray 129 reads out the serial ID and the notification process is carried out based on the print job ID to which the readout serial ID belongs.

Thus, in the present embodiment, by identifying the ID paper 201 and recognizing the destination of the notification using a serial ID pre-written in the contactless IC 202 on the ID paper 201, the data writing process to a contactless IC is eliminated. Consequently, only a contactless IC reader is required, thus eliminating the need for a contactless IC writer. This results in a reduction in the number of parts of the MFP, which, in the case where MFPs are mass produced, the production cost(s) can be reduced.

Fourth Embodiment

In the first to third embodiments, the notification process is carried out by using a contactless IC reader or a contactless IC reader/writer located on the output tray 129. In contrast, in a fourth embodiment, the notification process is carried out by using a contactless IC reader located on a surface of a chassis of the MFP 100. Additionally, in the first to third embodiments, the notification process is automatically carried out by detecting that printed and uncollected ID paper 201 is on the output tray 129. Unlike these embodiments, the notification process according to the fourth embodiment is carried out when a user holds the ID paper 201 over the contactless IC reader located on the surface of the chassis of the MFP 100.

The print process according to the present embodiment is substantially identical to that shown by the flow chart in FIG. 11 for the second embodiment. Only the difference will be briefly described without referring to a flow chart. The difference is that, in the print process of the present embodiment, a print job ID, a user name, a file name, and a job execution time are written to the contactless IC 202 on the ID paper 201, but not next-notification timing.

The notification process according to the present embodiment will be described next with reference to a flow chart shown in FIG. 14.

When the ID paper 201 is held over the contactless IC reader located on the surface of the chassis of the MFP 100 (step S1401), the CPU 301 causes the contactless IC reader to read out a print job ID, a user name, a file name, and a job execution time from the contactless IC 202 on the ID paper 201 (step S1402).

Subsequently, the CPU 301 creates a notification message, as shown in FIG. 10B, informing a user that the ID paper 201 is uncollected by using the print job ID, the user name, the file name, and the job execution time read from the contactless IC 202 on the ID paper 201 and a notification message format stored in the ROM 303 (refer to FIG. 10A). The CPU 301 then sends the notification message by e-mail to the user who submitted the print job based on the information about the notification destination shown in FIG. 9B (step S1403).

Thus, in the present embodiment, a contactless IC reader is located on a surface of a chassis of the MFP 100. When the ID paper 201 is held over the contactless IC reader, a notification that the ID paper 201 is uncollected is sent based on the information written to the contactless IC 202 on the ID paper 201.

Accordingly, for example, it is presumed that printed documents from a plurality of users are output and mixed together on the output tray 129. One of the users, in order to find the user's printed document, picks up another user's printed document from the output tray 129 and places it near the MFP 100. Under the present embodiment, in this scenario, any user who finds the printed document can determine the owner of the printed document and inform the owner of the printed document's location by simply holding the printed document over the contactless IC reader.

It should be noted that the present invention is not limited to the above-described first to fourth embodiments. The present invention is not limited to an MFP, and can be applied to any image forming apparatus, such as a printer having only a printing function, a copy machine having an image reading function and a printing function, or a facsimile. In addition, the present invention is applicable not only to the case where a document sent over a network is printed (e.g., a network printer), but also to the case where a document image is read locally by a scanner unit and printed.

Additionally, in the above-described first to fourth embodiments, detection of uncollected recording paper on the output tray is carried out at short intervals, such as 1 minute, followed by notification of the existence of the uncollected recording paper. However, detection of uncollected recording paper on the output tray may be carried out at longer intervals, such as every 30 minutes. In this case, unlike the first to fourth embodiments, a job execution time and next-notification timing need not be managed in a RAM nor be written to a contactless IC on recording paper. This results in the reduction of the CPU's 301 processing load.

Additionally, since the cost of recording paper with a contactless IC is significantly greater as compared to regular recording paper, only one sheet of the recording paper with a contactless IC would be used for one print job. For example, the recording paper having a contactless IC would only be used for the first page or the last page of the print job. In this case, the regular recording paper and the recording paper having a contactless IC may be loaded in different paper cassettes, and when, for example, an image for the first page or the last page is formed, the paper cassette may be switched to one for the recording paper having a contactless IC.

In addition, in the above-described first to fourth embodiments, a contactless writer, a contactless reader, and a contactless reader/writer are separately located in the vicinity of a fuser unit 126 and an output tray 129. However, if no writing operation to a contactless IC on recording paper loaded in a paper cassette is necessary, the device (i.e., contactless reader or contactless reader/writer) may be located, for example, on only the output tray 129 in order to reduce cost.

Furthermore, the notification that informs the user that the printed recording paper is uncollected may be carried out by another method, for example, a pager, instead of an e-mail.

Also, the notification that the printed recording paper is uncollected is not limited to being sent to a single destination, but can be sent to multiple destinations. In this case, for example, the first notification may be sent to a first destination and the second notification may be sent to a second destination different than the first destination. Alternatively, the first notification may be sent to a first destination and the second notification may be sent to both the first and a second destination. In this example, the first notification can also be sent to multiple destinations. By changing the destination for each notification, the printed recording paper can be collected more rapidly and more reliably.

Furthermore, if a small number of specific users share an image forming apparatus which has a large number of paper cassettes, the user names and the destination of notification for the users may be pre-recorded in contactless ICs on recording paper. In this case, for example, a paper cassette is assigned to each user. Recording paper with the contactless IC including the user name and the destination of notification is loaded into the paper cassette. Every time a print job is submitted, based on the user name included in the print, a paper cassette corresponding to the user name can be selected. This method eliminates the registration of the destination for each user in advance, and therefore, the amount of memory can be reduced. Also, the writing operation to a contactless IC on recording paper is eliminated, thus reducing the processing load of the device.

It will be appreciated that the above described aspects of the present invention can also be achieved by providing a storage medium or a recording medium that stores software (i.e., a program) that achieves the functions of the above-described embodiments in a system or an apparatus and by causing a computer (e.g., a CPU or a MPU) in the apparatus or system to read and execute the program stored in the storage medium.

In this case, the program itself read from the storage medium achieves the functions described in the above-described embodiments. A storage medium that stores the program achieves the present invention. Also, it will be appreciated that embodiments of the present invention include not only the case where a program read from a storage medium achieves the functions described in the above-described embodiment, but also the case where an operating system running on a computer executes some of or all functions described in the above-described embodiments in response to instructions of the program.

Furthermore, it will be appreciated that embodiments of the present invention include the case where, after a program read from a storage medium is stored in an add-on expansion board inserted in a computer or a memory of an add-on expansion board connected to a computer, the add-on expansion board or a CPU in the add-on expansion board executes some of or all functions described in the above-described embodiments. When the present invention is applied to the above-described storage medium, the storage medium includes program code that corresponds to the above-described flow charts shown in FIGS. 7, 8, 11, 13 or 14.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2003-385088 filed Nov. 14, 2003, which is hereby incorporated by reference herein.

What is claimed is:

1. An image forming apparatus comprising:
    writing means for writing job information associated with an image forming process to a contactless integrated chip attached to recording paper;
    reading means for reading out the job information written by the writing means from the contactless integrated chip attached to recording paper remaining uncollected after completion of the image forming process; and
    notification means for notifying, based on the job information read out by the reading means, that the recording paper is uncollected after completion of the image forming process.

2. The image forming apparatus according to claim 1, further comprising searching means for searching, based on the job information read out by the reading means, for a destination of the notification for use by the notification means.

3. The image forming apparatus according to claim 1, wherein the job information includes at least one of a job ID for identifying a job and user information for identifying a user who submitted the job.

4. The image forming apparatus according to claim 1, further comprising recording means for recording a job execution time of the job, wherein the notification means carries out the notification if a predetermined time has elapsed from the job execution time of a job associated with the job information read out by the reading means.

5. The image forming apparatus according to claim 1, wherein the notification means provides the notification via an electronic mail message.

6. The image forming apparatus according to claim 1, wherein the reading means reads out the job information at predetermined time intervals.

7. The image forming apparatus according to claim 1, wherein the reading means is located on an output unit of the image forming apparatus, wherein the recording paper is outputted to the output unit.

8. An image forming apparatus comprising:
    recording means for recording identification information for identifying recording paper and associated information about a user who initiated an image forming process, the identification information being pre-recorded in a contactless integrated chip attached to the recording paper;
    reading means for reading out the identification information from the contactless integrated chip attached to recording paper remaining uncollected after completion of the image forming process; and
    notification means for notifying the user recorded in association with the identification information read out by the reading means that the recording paper is uncollected.

9. The image forming apparatus according to claim 8, further comprising searching means for searching for information recorded in association with the identification information read out by the reading means.

10. An image forming method comprising:
    a writing step for writing job information associated with an image forming process to a contactless integrated chip attached to recording paper;
    a reading step for reading out the job information written in the writing step from the contactless integrated chip attached to recording paper remaining uncollected after completion of the image forming process; and a notification step for notifying, based on the job information read out in the reading step, that the recording paper is uncollected after completion of the image forming process.

11. The image forming method according to claim 10, further comprising a searching step for searching, based on the job information read out in the reading step, for a destination of the notification for use by the notification step.

12. The image forming method according to claim 10, wherein the job information includes at least one of a job identification information for identifying a job and user information for identifying a user who submitted the job.

13. The image forming method according to claim 10, further comprising a recording step for recording a job execution time of the job, wherein the notification step carries out the notification if a predetermined time has elapsed from the job execution time of a job associated with the job information read out by the reading step.

14. The image forming method according to claim 10, wherein the notification step provides the notification via an electronic mail message.

15. The image forming method according to claim 10, wherein the reading step reads out the job information at predetermined time intervals.

16. The image forming method according to claim 10, wherein the reading step is carried out by reading means located on a recording paper output unit.

17. An image forming method comprising:
a recording step for recording identification information for identifying recording paper and associated information about a user who initiated an image forming process, the identification information being pre-recorded in a contactless integrated chip attached to the recording paper;
a reading step for reading out the identification information from the contactless integrated chip attached to recording paper remaining uncollected after completion of the image forming process; and
a notification step for notifying the user recorded in association with the identification information read out by the reading step that the recording paper is uncollected.

18. The image forming method according to claim 17, further comprising a searching step for searching the information recorded in association with the identification information read out by the reading step.

19. Computer-executable process steps for controlling an image forming apparatus, the steps comprising:
writing job information associated with an image forming process to a contactless integrated chip attached to recording paper;
reading out the job information written in the writing step from the contactless integrated chip attached to recording paper remaining uncollected after completion of the image forming process; and
notifying, based on the job information read out in the reading step, that the recording paper is uncollected after completion of the image forming process.

20. Computer-executable process steps for controlling an image forming apparatus, the steps comprising:
recording identification information for identifying recording paper and associated information about a user who initiated an image forming process, the identification information being pre-recorded in a contactless integrated chip attached to the recording paper;
reading out the identification information from the contactless integrated chip attached to recording paper remaining uncollected after completion of the image forming process; and
notifying the user recorded in association with the identification information read out by the reading step that the recording paper is uncollected.

* * * * *